Figure 1:
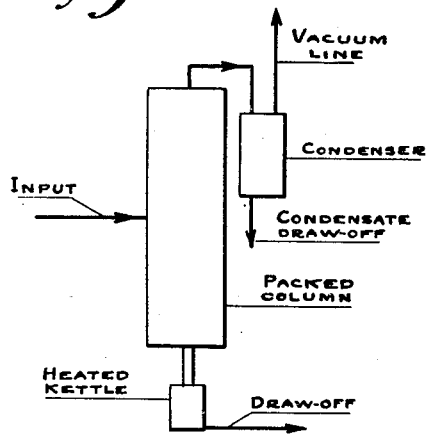
Figure 2:
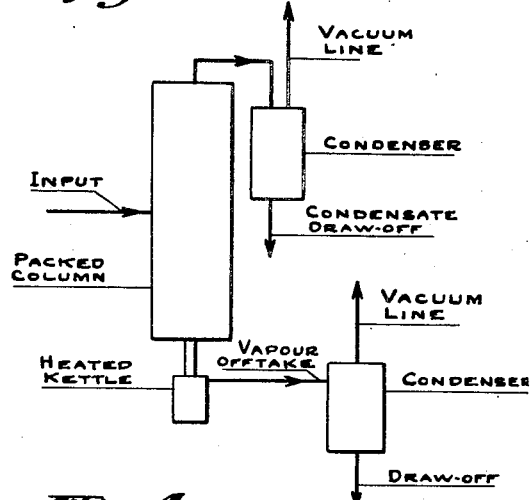
Figure 3:
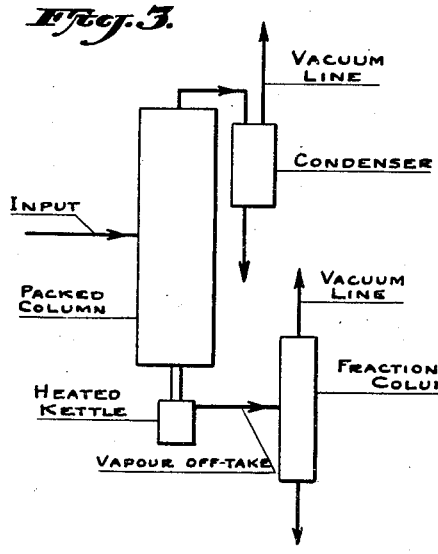
Figure 4:
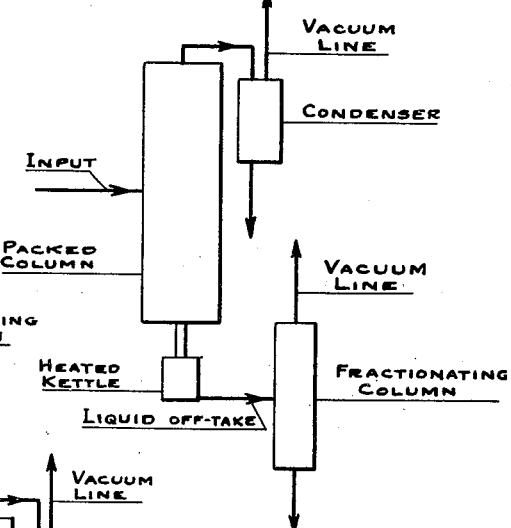
Figure 5:
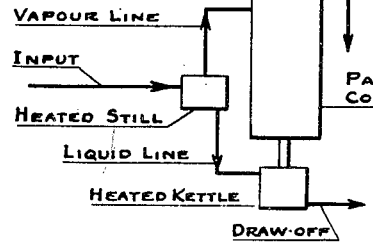

*INVENTORS.*
REGINALD HAROLD HALL.
KARL HEINRICH WALTER MERCK
BY
*ATTORNEYS.*

Patented Apr. 18, 1950

2,504,195

UNITED STATES PATENT OFFICE 2,504,195

DISTILLATION OF ACETIC ANHYDRIDE FROM OXIDATION MIXTURES CONTAINING PERCOMPOUNDS

Reginald Harold Hall, Sutton, and Karl Heinrich Walter Tuerck, Banstead, England, assignors to The Distillers Company, Limited, Edinburgh, Scotland, a British Company Application April 3, 1946, Serial No. 659,404
In Great Britain April 4, 1945

17 Claims. (Cl. 202—52)

This invention is for improvements in or relating to the production of acetic anhydride and is concerned with the recovery of the acetic anhydride formed in the oxidation of acetaldehyde, in the liquid phase, with molecular oxygen in the presence of catalysts, in which oxidation process, a mixture of acetic anhydride, acetic acid and water, containing also residual amounts of acetaldehyde and percompounds, is obtained. It is essential to remove the water from such a mixture as quickly and readily as possible so as to prevent extensive hydrolysis of the anhydride by the water which is co-present in the reaction product.

For the purpose of recovering the acetic anhydride it has been proposed to distil the reaction mixture with a diluent which is a suitable entrainer for water. However, the use of a diluent represents a complication especially if no diluent has been employed in the oxidation process as is the case where a high rate of oxidation is maintained whereby the relative loss of acetic anhydride by hydrolysis is reduced.

It has also been proposed in prior British Patent 446,259 to distil the reaction mixture rapidly in vacuo, whilst in the process described in prior British Patent No. 514,268 the reaction mixture is flash-distilled under reduced pressure at a temperature of 38°–42° C. and the resulting vapors fractionated in vacuo. This fractionation of the reaction mixture has generally been carried out at a pressure below 40 mm. Hg, and even at pressures as low as 10 mm. Hg, a recovery of only 87% by weight of the acetic anhydride introduced into the still is reported in German Patent No. 411,106.

It has been found that low pressures cannot be safely used in the fractionation of the oxidation reaction mixture for the purpose of isolating the acetic anhydride from the still residue, as the temperatures obtaining during fractionation are not sufficiently high to effect the decomposition of the percompounds present in the reaction mixture during the distillation process. Thus, with the usual catalysts, a temperature of at least 70° C. is necessary in order to destroy the percompounds, or to reduce their concentration to a safe level, in a reasonable time. In continuous distillation processes, the normal time that substances remain in the kettle is one hour or less and, in order to achieve the destruction or reduction of concentration, of the percompounds before the liquid is withdrawn from the kettle, it is preferred to use temperatures not lower than 75° C.

On the other hand, it is well known that the rate of hydrolysis of acetic anhydride becomes very high at temperatures above 50° C. and, in fact, it has been stated in U. S. A. Specification No. 2,320,461, that in order to recover a reasonable quantity of acetic anhydride from the reaction mixture it is necessary to maintain the temperature of the mixture below 60° C. during distillation.

It has now been found that it is possible to recover acetic anhydride from the reaction mixture obtained by the liquid phase oxidation of acetaldehyde with molecular oxygen free from water and substantially free from percompounds in accordance with the process of the present invention which comprises continuously feeding the reaction mixture into a packed column and effecting a fractional distillation therein at a pressure between 80 mm. and 200 mm. Hg whilst carrying out the distillation so that the liquid in the kettle at the base of the said column contains not more than 30% by weight of acetic acid in addition to acetic anhydride. Preferably the volume of the kettle is sufficient to bring about substantially complete decomposition of the percompounds, i. e. to reduce their concentration in said liquid to a value less than 0.1% by weight thereof, reckoned as per-acid. In this way, more than 90%, and even more than 94%, by weight of the acetic anhydride contained in the reaction mixture to be distilled can be recovered from the kettle. This is surprising in view of the fact that the rate of hydrolysis of acetic anhydride is more than doubled by a temperature rise of 10° C.

In operating according to the invention, the temperature of the liquid in the kettle is kept above 70° C. and preferably above 75° C.

The reaction mixtures to be fractionated may, for example, contain from 30–60 parts acetic anhydride, in addition to 5–15 parts of water and an amount of acetic acid, from about 60 parts to 20 parts. Acetaldehyde may also be present, in addition to an amount of percompounds up to about 2 parts, the quantities referred to being all calculated by weight.

The present process is of special importance in the continuous process of oxidation of acetaldehyde, where a product is continuously withdrawn containing a small amount of acetaldehyde, or in a batch process in which, in order to obtain optimum yields of anhydride, the oxidation is not carried to completion. At the moderately reduced pressure employed according to the process of the invention, a considerable amount, 5% by weight and more, of acetaldehyde can readily be condensed in the distillate, so that the losses of acetaldehyde passing into the vacuum pump can be reduced, or even avoided altogether, and the stripping of the reaction product before it passes to the packed column can be reduced or even entirely dispensed with as compared with the situation arising where pressures as low as 10 mm. Hg are used.

It is a further obvious advantage of the present process that, in view of the higher temperatures employed, a smaller condenser surface is needed and normal cooling water can be used for the condensers as compared with the larger condensers and refrigerated coolants needed with lower temperatures. The diameter of the column can be kept smaller in view of the lower vapor velocities and a vacuum pump of smaller capacity is sufficient.

The design of the fractionating column has to be such as to permit, with a reasonable reflux, the removal by distillation of the whole of the water originally present in the reaction mixture together with the acetic acid in excess of the amount permitted to be collected in the kettle. It is found that with a normal oxidation product, the distillation can successfully be carried out when the reaction mixture is fed into the column at a point which is approximately in the middle of its length, and a reflux ratio of between 1:1 and 3:1 maintained. The packings in the column should be such that, under operating conditions, they do not cause a hold-up of liquid in the column of more than 10% by volume of the column and it is preferred that they should be so chosen that less than 5%, calculated on the volume of the column, of liquid is held up in the packed column.

Instead of introducing the reaction mixture in the liquid state into the fractionating column, it may be introduced in the form of vapors. For this purpose the reaction mixture is subjected to rapid evaporation in a separate still from which the vapors are conducted into the fractionating column, in accordance with this invention. The residual liquid in this still may be drawn off from the bottom of said still and added to the liquid in the kettle at the foot of the fractionating column. This procedure has the advantage that the catalyst suspended in the reaction mixture is not introduced into the fractionating column, where in time it is apt to clog the packing material by being deposited upon it.

The following examples illustrate the manner in which the process of the invention may be carried into effect, the quantities referred to being given by weight throughout.

Example 1

A reaction product from the oxidation of acetaldehyde, containing 34.9% of acetic anhydride, 50.7% of acetic acid, 8.0% of water, 4.3% of acetaldehyde, 0.9% of methyl acetate, 0.5% of a mixture of cobalt and copper acetates and 0.7% of percompounds was fractionated in a packed column of a length and packing corresponding to 13 theoretical plates, to the bottom of which a kettle is connected, at a pressure of 150–160 mm. Hg. The feed was introduced at a point corresponding to the sixth plate from the bottom of the column. The vapor velocity in the column was about 80 cm./seconds, the reflux ratio 3:1, and the surface of the packing per theoretical plate was 0.12 sq. metre.

The temperature in the kettle was maintained at 83° C., the temperature at the feed point being 68° C. and that at the top of the column 61° C.

The liquid in the kettle contained 85.2% of acetic anhydride, 14.8% of acetic acid and 0.0025% of percompounds; 94% of the acetic anhydride fed into the column was recovered from the kettle.

The distillate contained approximately 76.5% of acetic acid, 6.2% of acetaldehyde and 2.0% of methyl acetate, the residue being water.

The concentrated anhydrous acetic anhydride, which contained most of the catalyst in suspension, was withdrawn from the kettle, decanted and fractionated in a second still; alternatively the acetic anhydride may be withdrawn from the kettle in the form of vapors instead of as a liquid and condensed either directly or passed into a second fractionating column from which the anhydride is recovered in a state of higher concentration.

Example 2

In the following table there are given the results of a number of experiments carried out, in the same apparatus as that used in Example 1, at various temperatures and pressures. In all cases the reaction mixture to be distilled contained 0.83% of percompounds.

| | Pressure in the column mm./Hg | Kettle Temp., °C. | Recovery of anhydride | Acetic acid in the kettle liquid, percent | Time for reducing the percompounds to less than 0.1% in hrs. |
|---|---|---|---|---|---|
| 1 | 25 | 48 | 94 | 38 | >55 |
| 2 | 25 | 54 | 98 | 15 | 55 |
| 3 | 80 | 75 | 96.3 | 6 | 0.66 |
| 4 | 150 | 86 | 94.8 | 17 | 0.079 |
| 5 | 150 | 79 | 87.4 | 45.6 | --- |
| 6 | 250 | 95 | 87.4 | 26 | 0.016 |

The figures for recovery of anhydride show the percentage of anhydride recovered calculated on the basis of the weight fed into the column.

It will be noted that in the first two experiments, although the recovery of acetic anhydride is excellent, the rate of decomposition is so low that the percompounds could not be reduced to a safe value during distillation.

The results of Experiment 5 show the effect of a high percentage of acetic acid in the kettle, namely a marked drop in the figure of acetic anhydride recovered; the figure for the last column was not determined but it will be appreciated that the value would be intermediate the figures for Experiments 3 and 4.

The results of Experiment 6 show the effect of a pressure above 200 mm./Hg, namely a marked drop in the figure of acetic anhydride recovered.

It is found that at a kettle temperature of 70° C., the time for reducing the percompound content to a value of less than 0.1% is 1.79 hours and as will be seen from Experiments 3, 4 and 6, at kettle temperatures of 75° C. and upwards, this time is considerably less than one hour so that a continuous distillation can be effected at temperatures above 75° C., the liquid withdrawn from the kettle being substantially free from percompounds.

The accompanying diagrammatic drawings illustrate the various modes of operation.

What we claim is:

1. A process for the recovery of acetic anhydride from an oxidation reaction mixture containing acetic anhydride in admixture with acetic acid, water and percompounds which comprises continuously feeding said reaction mixture into a packed fractionating column having a kettle connected to the base thereof and effecting a fractional distillation therein at a pressure between 80 mm. and 200 mm. Hg whilst carrying out the distillation so that the liquid in the kettle at the base of the said column contains not more than 30% by weight of acetic acid in addition to acetic anhydride and withdrawing the concentrated acetic anhydride from the kettle.

2. A process according to claim 1 wherein the liquid is retained in the kettle for a period of time sufficient to reduce the concentration of percompounds therein to a value of less than 0.1% by weight, calculated as peracid.

3. A process according to claim 1 wherein the liquid in the kettle is maintained at a temperature above 70° C.

4. A process for the recovery of acetic anhydride from an oxidation reaction mixture containing acetic anhydride in admixture with acetic acid, water and percompounds which comprises continuously feeding said reaction mixture into approximately the middle of the height of a packed fractionating column having a kettle connected to the base thereof and effecting a fractional distillation therein at a presure between 80 mm. and 200 mm. Hg whilst carrying out the distillation so that the liquid in the kettle at the base of the said column contains not more than 30% by weight of acetic acid in addition to acetic anhydride and withdrawing the concentrated acetic anhydride from the kettle.

5. A process for the recovery of acetic anhydride from an oxidation reaction mixture containing acetic anhydride in admixture with acetic acid, water and percompounds which comprises continuously feeding said reaction mixture into a packed fractionating column having a kettle connected to the base thereof and effecting a fractional distillation therein at a pressure between 80 mm. and 200 mm. Hg whilst maintaining a reflux ratio of between 1:1 and 3:1 and whilst carrying out the distillation so that the liquid in the kettle at the base of the said column contains not more than 30% by weight of acetic acid in addition to acetic anhydride and withdrawing the concentrated acetic anhydride from the kettle.

6. A process for the recovery of acetic anhydride from an oxidation reaction mixture containing acetic anhydride in admixture with acetic acid, water and percompounds which comprises continuously feeding said reaction mixture into approximately the middle of the height of a packed fractionating column having a kettle connected to the base thereof and effecting a fractional distillation therein at a pressure between 80 mm. and 200 mm. Hg whilst maintaining a reflux ratio of between 1:1 and 3:1 and whilst carrying out the distillation so that the liquid in the kettle at the base of the said column contains not more than 30% by weight of acetic acid in addition to acetic anhydride and withdrawing the concentrated acetic anhydride from the kettle.

7. A process according to claim 1 wherein the reaction mixture is fed to said packed fractionating column in vapour form.

8. A process for the recovery of acetic anhydride from an oxidation reaction mixture containing acetic anhydride in admixture with acetic acid, water and percompounds which comprises continuously feeding said reaction mixture into a still, rapidly evaporating it and conveying the vapourous reaction mixture into a packed fractionating column having a kettle connected to the base thereof and effecting a fractional distillation therein at a pressure between 80 mm. and 200 mm. Hg whilst carrying out the distillation so that the liquid in the kettle at the base of the said column contains not more than 30% by weight of acetic acid in addition to acetic anhydride and withdrawing the concentrated acetic anhydride from the kettle.

9. A process for the recovery of acetic anhydride from an oxidation reaction mixture containing acetic anhydride in admixture with acetic acid, water and percompounds which comprises continuously feeding said reaction mixture into a still, rapidly evaporating it and conveying the vapourous reaction mixture into approximately the middle of the height of a packed fractionating column having a kettle connected to the base thereof and effecting a fractional distillation therein at a pressure between 80 mm. and 200 mm. Hg whilst carrying out the distillation so that the liquid in the kettle at the base of the said column contains not more than 30% by weight of acetic acid in addition to acetic anhydride and withdrawing the concentrated acetic anhydride from the kettle.

10. A process according to claim 1 wherein the concentrated acetic anhydride in the kettle is withdrawn to a second fractionating column and fractionated therein.

11. A process according to claim 1 wherein the vapours in the kettle are withdrawn to a second fractionating column for concentration of the acetic anhydride.

12. A process according to claim 8 wherein residual liquid from said still is fed directly to the kettle at the base of said packed fractionating column.

13. A process according to claim 9 wherein residual liquid from said still is fed directly to the kettle at the base of said packed fractionating column.

14. A process for the recovery of acetic anhydride from an oxidation reaction mixture containing acetic anhydride in admixture with acetic acid, water and percompounds which comprises continuously feeding said reaction mixture into a still, rapidly evaporating it and conveying the vapourous reaction mixture into approximately the middle of the height of a packed fractionating column having a kettle connected to the base thereof and effecting a fractional distillation therein at a pressure between 80 mm. and 200 mm. Hg whilst carrying out the distillation so that the liquid in the kettle at the base of the said column contains not more than 30% by weight of acetic acid in addition to acetic anhydride, withdrawing the concentrated acetic anhydride from the kettle, introducing the withdrawn concentrated acetic anhydride to a second fractionating column to separate substantially pure acetic anhydride from copresent acetic acid and withdrawing said substantially pure acetic anhydride from said second fractionating column.

15. A process for the recovery of acetic anhydride from an oxidation reaction mixture containing acetic anhydride in admixture with acetic acid, water and percompounds which comprises continuously feeding said reaction mixture into a still, rapidly evaporating it and conveying the vapourous reaction mixture into approximately the middle of the height of a packed fractionating column having a kettle connected to the base thereof and effecting a fractional distillation therein at a pressure between 80 mm.

and 200 mm. Hg whilst carrying out the distillation so that the liquid in the kettle at the base of the said column contains not more than 30% by weight of acetic acid in addition to acetic anhydride, withdrawing the concentrated acetic anhydride from the kettle in the form of its vapours and introducing the withdrawn concentrated acetic anhydride vapours to a second fractionating column to separate substantially pure acetic anhydride from copresent acetic acid and withdrawing said substantially pure acetic anhydride from said second fractionating column.

16. A process for the recovery of acetic anhydride from an oxidation reaction mixture containing acetic anhydride in admixture with acetic acid, water and percompounds which comprises continuously feeding said reaction mixture into a still, rapidly evaporating it and conveying the vapourous reaction mixture into approximately the middle of the height of a packed fractionating column having a kettle connected to the base thereaof, conveying the liquid residue in said still to said kettle and effecting a fractional distillation therein at a pressure between 80 mm. and 200 mm. Hg whilst carrying out the distillation so that the liquid in the kettle at the base of the said column contains not more than 30% by weight of acetic acid in addition to acetic anhydride, withdrawing the concentrated acetic anhydride from the kettle, introducing the withdrawn concentrated acetic anhydride to a second fractionating column to separate substantially pure acetic anhydride from copresent acetic acid and withdrawing said substantially pure acetic anhydride from said second fractionating column.

17. A process according to claim 1 wherein the vapours in the kettle are withdrawn to a condenser.

REGINALD HAROLD HALL.
KARL HEINRICH WALTER TUERCK.

REFERENCES CITED

The following references are of record in the file of this patent:

UNITED STATES PATENTS

| Number | Name | Date |
|---|---|---|
| 2,232,705 | Hull | Feb. 25, 1941 |
| 2,320,461 | Murray | June 1, 1943 |
| 2,367,501 | Hull et al. | Jan. 16, 1945 |